(12) United States Patent  
Adachi (10) Patent No.: US 8,730,866 B2
(45) Date of Patent: May 20, 2014

(54) RADIO BASE STATION AND COMMUNICATION CONTROL METHOD

(75) Inventor: Hiroyuki Adachi, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 101 days.

(21) Appl. No.: 13/472,242

(22) Filed: May 15, 2012

(65) Prior Publication Data

US 2012/0294172 A1    Nov. 22, 2012

(30) Foreign Application Priority Data

May 16, 2011 (JP) .................................. 2011-109094

(51) Int. Cl.
*H04B 7/185* (2006.01)

(52) U.S. Cl.
USPC ........... 370/318; 370/465; 370/252; 455/522; 455/69; 455/67.11

(58) Field of Classification Search
USPC ......... 370/230, 252, 254, 255, 317, 318, 320, 370/321, 322, 332, 333, 334, 335, 443; 455/63.11, 67.11, 67.13, 114.2, 226.2, 455/278.1, 283, 296, 423, 522

See application file for complete search history.

(56) References Cited

U.S. PATENT DOCUMENTS 7,738,412 B2 *   6/2010   Hamalainen et al. ......... 370/318

OTHER PUBLICATIONS

3GPP TS 36.213; 3rd Generation Partnership Project; Technical Specification Group Radio Access Network; Evolved Universal Terrestrial Radio Access (E-UTRA); Physical layer procedures (Release 10).

* cited by examiner

*Primary Examiner* — Dady Chery
(74) *Attorney, Agent, or Firm* — Studebaker & Brackett PC (57) ABSTRACT

A radio base station communicating with a radio terminal, comprising a control unit configured to perform scheduling of a radio resource with respect to the radio terminal, wherein the control unit estimates transmission power of the radio terminal, which is calculated by the radio terminal, based on information on transmission power notified from the radio terminal, calculates power of an uplink signal from the radio terminal based on uplink propagation loss between the radio base station and the radio terminal, and performs the scheduling based on a difference between a first power obtained by the estimation of the transmission power of the radio terminal and a second power obtained by the calculation of the power of the uplink signal.

3 Claims, 7 Drawing Sheets

RADIO BASE STATION AND COMMUNICATION CONTROL METHOD

CROSS REFERENCE TO RELATED APPLICATIONS

This application is based upon and claims the benefit of priority from prior Japanese Patent Application No. 2011-109094, filed on May 16, 2011; the entire contents of which are incorporated herein by reference.

BACKGROUND OF THE INVENTION

1. Field of the Invention

The present invention relates to a radio base station and a communication control method.

2. Description of the Related Art

In an LTE (Long Term Evolution) mobile communication system defined in 3GPP, a transmission power of a signal of a physical uplink shared channel (hereinafter, referred to as PUSCH), which is used when a radio terminal transmits data, is calculated based on propagation loss PL in radio communication between a radio base station (eNB) and a radio terminal (UE) and scheduling information set by the radio base station. Specifically, the transmission power is calculated based on Equation 1 below (refer to 3GPP, TS36.213 (Ve10.0.1), "Physical Layer Procedures" December 2010.).

[Equation 1]

$$P_{PUSCH}(i) = \min \begin{Bmatrix} P_{CMAX}, \\ 10\log_{10}(M_{PUSCH}(i)) + P_{O\_PUSCH} + \alpha \cdot PL + \Delta_{TF}(i) + f(i) \end{Bmatrix} [dBm] \quad (1)$$

In Equation 1 above, the $P_{PUSCH}(i)$ denotes the transmission power of the signal of the PUSCH. The i denotes a subframe number. The $P_{CMAX}$ denotes maximum transmission power of the radio terminal. The $M_{PUSCH}(i)$ denotes the number of Resource Blocks (hereinafter, referred to as RBs) assigned to the radio terminal by the radio base station in a subframe i. In addition, the RB denotes a time-frequency unit in which a bandwidth is 180 kHz (corresponds to 12 subcarriers) and a time length is 0.5 ms (corresponds to 7 resource symbols). The $P_{O\_PUSCH}$ denotes an initial value of transmission power per one RB unique to the radio terminal. The $\alpha$ denotes a coefficient for controlling a propagation loss compensation rate. The PL denotes radio wave propagation loss between the radio base station and the radio terminal. The propagation loss denotes a parameter indicating the degree of attenuation at a reception side of transmission power from a transmission side. The $\Delta_{TF}(i)$ denotes a coefficient determined from MCS (Modulation and Coding Scheme). The f(i) denotes a correction term of transmission power based on TPC (Transmit Power Control) command transmitted from the radio base station to the radio terminal.

In the LTE, the radio base station performs scheduling for assigning radio resources (RB and MCS), which are required for uplink (hereinafter, referred to as "UL") and downlink (hereinafter, referred to as "DL") communication, to the radio terminal in advance, and notifies the radio terminal of information (scheduling information), which indicates the scheduled content, using PDCCH (Physical Downlink Control Channel). In addition, the radio base station determines a radio resource according to radio wave propagation situations between the radio base station and the radio terminal.

When performing the scheduling, the radio base station calculates SINR (Signal to Interference and Noise Ratio) using the transmission power of the radio terminal, and average interference power or thermal noise measured by the radio base station. The radio base station acquires radio wave propagation situations based on the calculated SINR. In this case, it is not possible for the radio base station to acquire information, which indicates the transmission power when the radio terminal has actually transmitted the signal of the PUSCH, from the radio terminal. Therefore, the radio base station should estimate (calculate) the transmission power when the radio terminal has actually transmitted the signal of the PUSCH. In this case, the radio base station calculates the transmission power of the signal of the PUSCH for the radio terminal using Equation 1 above, and then estimates the calculated transmission power as the transmission power when the radio terminal has actually transmitted the signal of the PUSCH.

When calculating the transmission power (for example, the transmission power of the PUSCH) for the radio terminal using Equation 1 above, the radio base station calculates the transmission power by applying, as propagation loss (hereinafter, appropriately referred to as PL), PL of the UL. On the other hand, when calculating the transmission power using Equation 1 above, the radio terminal applies PL of the DL as the PL. Therefore, when the PL of UL is different from the PL of the DL, values of the transmission power calculated using Equation 1 are different from each other in the radio base station and the radio terminal. In addition, when the PL of UL is different from the PL of DL, for example, the following situations (A) and (B) occur. These situations are generally expected to occur. (A) A situation where the radio terminal moves at a high speed, so that fading variation rapidly occurs in a radio environment between the radio base station and the radio terminal, resulting in a big difference of fading gain between the UL and the DL. (B) A situation where in an environment in which communication is relayed by an AF (Amplify and Forward) relay node having different amplification rates in the UL and the DL between the radio base station and the radio terminal, signals are transmitted between the radio base station and the radio terminal. As described above, if the transmission power of the radio terminal calculated by applying the PL of the UL by the radio base station is different from the transmission power of the radio terminal calculated by applying the PL of the DL by the radio terminal, it is highly probable that the UL scheduling performed for the radio terminal by the radio base station is inappropriate. That is, in such situations, communication quality between the radio base station and the radio terminal may tend to deteriorate.

Particularly, when the AF relay node relays radio communication between the radio base station and the radio terminal, the AF relay node performs an amplification process. Due to the amplification process, a delay time occurs in a signal transmitted between the radio base station and the radio terminal in a radio manner. When the delay time is larger than a CP (Cyclic Prefix) length in an apparatus (for example, the radio terminal) at a reception side, the apparatus at the reception side simultaneously receives a direct wave directly reaching from a wave source (for example, the radio base station), and a delayed wave having a large delay time. Therefore, inter-symbol interference, inter-carrier interference, and deterioration of the accuracy of channel estimation occur, resulting in the deterioration of reception quality. Particularly, since the deterioration of the accuracy of the channel estimation in the apparatus at the reception side is largely affected as the order of the modulation and coding scheme is increased, the deterioration of the reception quality is increased. Particularly, when the apparatus at the reception side is a terminal, since the performance of the channel estimation is limited, the terminal is largely affected by the influence due to the deterioration of the accuracy of the channel estimation caused by delay.

SUMMARY OF THE INVENTION

To solve the above problem, the present invention has following feature. A first feature of the present invention is summarized as a radio base station (radio base station 100) communicating with a radio terminal (radio terminal 300), comprising a control unit (control unit 103) configured to perform scheduling of a radio resource with respect to the radio terminal, wherein the control unit estimates transmission power of the radio terminal, which is calculated by the radio terminal, based on information on transmission power notified from the radio terminal, calculates power of an uplink signal from the radio terminal based on uplink propagation loss between the radio base station and the radio terminal, and performs the scheduling based on a difference between a first power obtained by the estimation of the transmission power of the radio terminal and a second power obtained by the calculation of the power of the uplink signal.

Even in radio environments in which the propagation loss of the UL and the propagation loss of the DL are different from each other, it is possible for the radio base station to perform scheduling capable of avoiding the deterioration of communication quality.

A second feature of the present invention is summarized as that the radio resource includes a resource block, and the control unit allocates more resource blocks compared with resource blocks assigned through scheduling performed when an absolute value (|A1-B1| or |A2-B2|) of the difference does not exceed a predetermined threshold value (Th1), when the absolute value of the difference between the first power and the second power exceeds the predetermined threshold value.

In this case, when an absolute value of the difference between first power and second power exceeds a predetermined threshold value, that is, in the radio environments in which the propagation loss of the UL and the propagation loss of the DL are different from each other, it is possible for the radio base station to perform scheduling in order to satisfy the amount of information required for communication between the radio base station and the radio terminal.

A third feature of the present invention is summarized as that the radio resource includes a modulation and coding scheme, and the control unit allocates lower order of a modulation and coding scheme compared with a modulation and coding scheme assigned through scheduling performed when an absolute value of the difference does not exceed a predetermined threshold value, when the absolute value of the difference between the first power and the second power exceeds the predetermined threshold value.

In this case, when the absolute value of the difference between the first power and the second power exceeds the predetermined threshold value, that is, in the radio environments in which the propagation loss of the UL and the propagation loss of the DL are different from each other, it is possible for the radio base station to perform scheduling in order to guarantee communication quality between the radio base station and the radio terminal.

A fourth feature of the present invention is summarized as that the control unit estimates the transmission power of the radio terminal, which is calculated by the radio terminal, based on information indicating Power Headroom, which is information on transmission power of the radio terminal notified from the radio terminal, and information on maximum transmission power of the radio terminal. "Power Headroom" (hereinafter referred as to "PHR") is criteria indicating a difference of a maximum transmission power of the radio terminal and a transmission power of UL used by the radio terminal assuming that there is no limitation about the maximum transmission power.

Based on information indicating PHR notified from the radio terminal, it is possible for the radio base station to estimate power of a signal actually transmitted by the radio terminal through the UL. Consequently, even in the radio environments in which the propagation loss of the UL and the propagation loss of the DL are different from each other, it is possible for the radio base station to appropriately estimate the transmission power of the radio terminal. In this way, it is possible for the radio base station to perform scheduling capable of avoiding the deterioration of communication quality.

A fifth feature of the present invention is summarized as a communication control method in a radio base station communicating with a radio terminal, comprising: a first step of estimating transmission power of the radio terminal, which is calculated by the radio terminal, based on information on transmission power notified from the radio terminal, and calculating power of an uplink signal from the radio terminal based on uplink propagation loss between the radio base station and the radio terminal; and a second step of performing scheduling based on a difference between first power obtained by the estimation of the transmission power of the radio terminal and second power obtained by the calculation of the power of the uplink signal.

DETAILED DESCRIPTION OF THE EMBODIMENTS

Hereinafter, an embodiment of the present invention will be described with reference to the accompanying drawings. Specifically, (1) Configuration of radio communication system, (2) Operation of radio communication system, (3)

Figure 1:
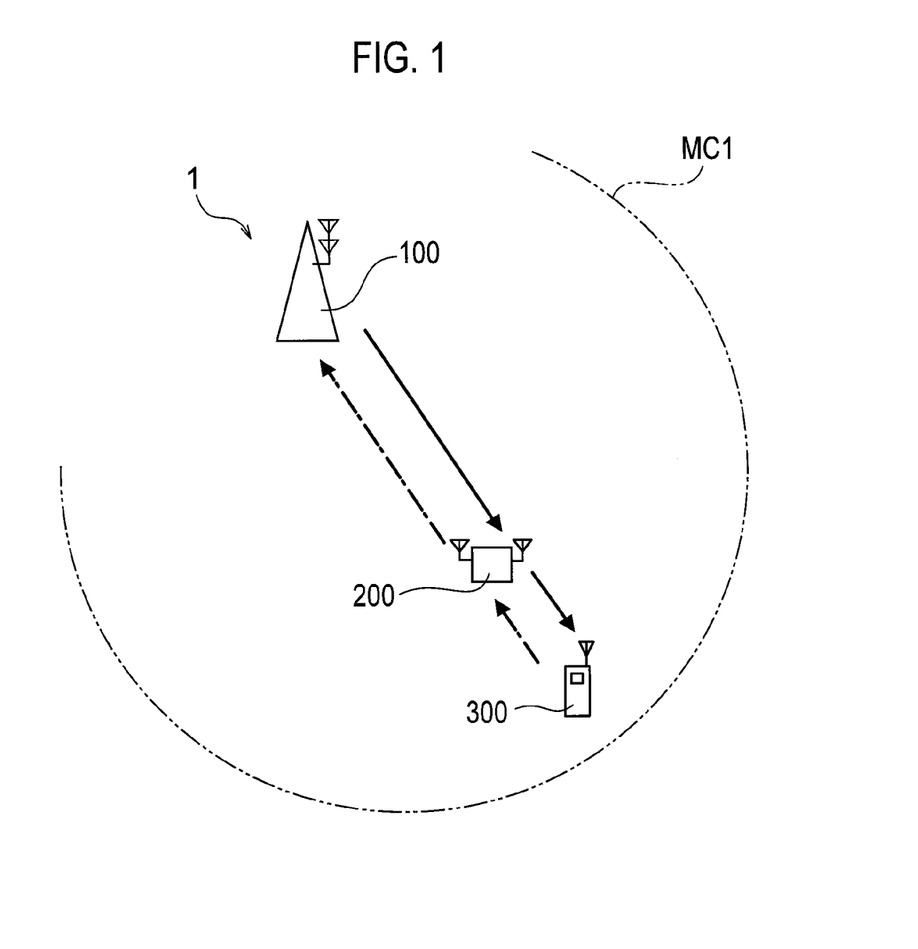
FIG. 1 is an entire schematic configuration diagram of a radio communication system according to an embodiment of the present invention.

Operation and effect, and (4) Other embodiments will be described. In all drawings for explaining the following embodiments, the same or similar reference numerals are used to designate the same or similar elements.
(1) Configuration of Radio Communication System
(1.1) Entire Schematic Configuration of Radio Communication System FIG. 1 is a diagram showing the entire schematic configuration of a radio communication system 1 according to an embodiment of the present invention. The radio communication system 1, for example, has a configuration based on LTE-Advanced, which is positioned as a fourth generation (4G) cellular phone system.

As illustrated in FIG. 1, the radio communication system 1 includes a radio base station (MeNB) 100 forming a large cell (for example, a macro cell) MC1, an AF (Amplify and Forward) relay node 200 as a communication relay apparatus which is, for example, installed in a building and the like, and a radio terminal (UE) 300 positioned in the large cell MC1. In addition, the AF relay node 200 is also called a repeater.

In the radio communication system 1 illustrated in FIG. 1, DL radio communication is performed from the radio base station 100 to the radio terminal 300 through the AF relay node 200. Furthermore, UL radio communication is performed from the radio terminal 300 to the radio base station 100 through the AF relay node 200.
(1.2) Configuration of Radio Terminal FIG. 2 is a diagram illustrating the configuration of the radio terminal 300 of the radio communication system 1 according to the embodiment of the present invention.

Figure 2:
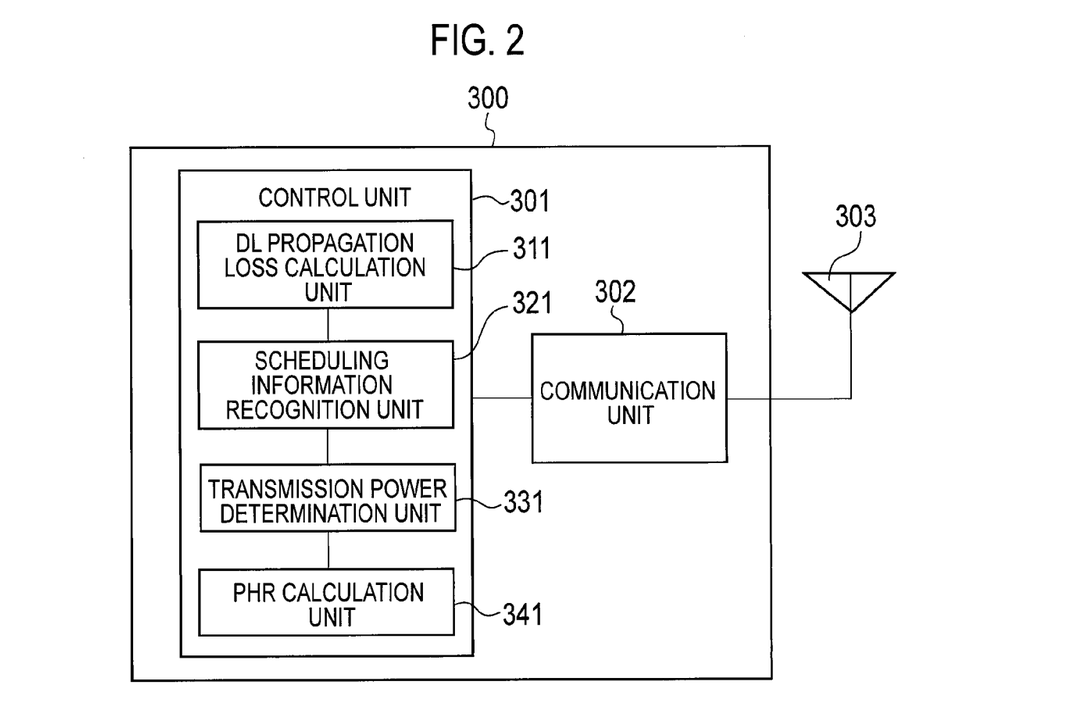
FIG. 2 is a diagram illustrating the configuration of a radio terminal of the radio communication system according to the embodiment of the present invention.

As illustrated in FIG. 2, the radio terminal 300 includes a control unit 301, a communication unit 302, and an antenna 303. The control unit 301, for example, is configured by a CPU (Central Processing Unit) and the like, and controls various functions of the radio terminal 300.

The control unit 301 includes: a DL propagation loss calculation unit 311 configured calculate DL propagation loss between the radio base station 100 and the radio terminal 300; a scheduling information recognition unit 321 configured to recognize information (including "information element" which will be described later) on UL scheduling determined by the radio base station 100; a transmission power determination unit 331 configured to determine the transmission power (for example, the transmission power of a PUSCH signal) of the radio terminal 300 based on the DL propagation loss calculated by the DL propagation loss calculation unit 311 and the information element included in the UL scheduling information recognized by the scheduling information recognition unit 321, and a PHR calculation unit 341 configured to calculate a PHR of the radio terminal 300 based on the transmission power determined by the transmission power determination unit 331.

The DL propagation loss calculation unit 311 calculates the DL propagation loss between the radio base station 100 and the radio terminal 300 based on a reception power value when the radio terminal 300 has received a signal from the radio base station 100, and a transmission power value of the radio base station 100 which is already recognized in the radio terminal 300. In addition, the propagation loss includes distance attenuation, shadowing loss, and feature pass loss.

The scheduling information recognition unit 321 recognizes the UL scheduling information notified to the radio terminal 300 from the radio base station 100. The scheduling information includes RB (information on a frequency band) and MCS used when the radio terminal 300 performs radio communication. Furthermore, the scheduling information includes information element (for example, information indicating the parameters the $P_{o\_PUSCH}$ and the f(i) in Equation 1 above) used when the radio terminal 300 determines the transmission power of the UL (for example, the transmission power of the PUSCH signal). The scheduling in the radio base station 100 will be described later.

The transmission power determination unit 331 determines the transmission power based on the DL propagation loss calculated by the DL propagation loss calculation unit 311 and the UL scheduling information recognized by the scheduling information recognition unit 321. Hereinafter, the case of determining the transmission power of the PUSCH (Physical Uplink Shared Channel) signal will be described.

The transmission power determination unit 331, specifically, determines (calculates) the transmission power of the PUSCH signal based on Equation 1 above. In this case, the transmission power determination unit 331 applies the DL propagation loss calculated by the DL propagation loss calculation unit 311 to the PL of Equation 1. Furthermore, the transmission power determination unit 331 applies the number of RBs used for communication with the radio base station 100, which is recognized by the scheduling information recognition unit 321, to the $M_{PUSCH}(i)$ of Equation 1. Furthermore, the transmission power determination unit 331 applies the MCS used for communication with the radio base station, which is recognized by the scheduling information recognition unit 321, to the $\Delta_{TF}(i)$ of Equation 1. Furthermore, the transmission power determination unit 331 applies the information element (in this case, the $P_{o\_PUSCH}(i)$ and the f(i)), which is recognized by the scheduling information recognition unit 321, to Equation 1.

The PHR calculation unit 341 calculates the PHR of the radio terminal 300 based on the transmission power of the radio terminal 300 determined by the transmission power determination unit 331. Specifically, the PHR of the radio terminal 300 is calculated based on Equation 2 below. The PHR is indicated by a decibel value.

[Equation 2]

$$\begin{aligned}PH(i) &= P_{CMAX} - P_{PUSCH}(i) \quad [\text{dB}] \quad (2)\\ &= P_{CMAX} - \{10\log_{10}(M_{PUSCH}(i)) + P_{O\_PUSCH} + \\ &\quad \alpha \cdot PL + \Delta_{TF}(i) + f(i)\}\end{aligned}$$

In Equation 2 above, the PH(i) denotes the PHR of the radio terminal 300 in a subframe i. The $P_{CMAX}$ denotes the maximum transmission power of the radio terminal 300. The $P_{PUSCH}(i)$ denotes PUSCH transmission power in the subframe i calculated by the transmission power determination unit 331 using Equation 1. Since the $M_{PUSCH}(i)$, the $P_{o\_PUSCH}$, the coefficient α, the PL, the $\Delta_{TF}(i)$, and the f(i) are equal to the above-mentioned description, a description thereof will not be repeated.

The PHR calculated by the PHR calculation unit 341 denotes transmission power increasable by the radio terminal 300. When the PHR is large, it indicates that the transmission power increasable by the radio terminal 300 is large. When the PHR is small, it indicates that the transmission power increasable by the radio terminal 300 is small.

The communication unit 302 transmits information (hereinafter, referred to as "PHR information". The PHR information indicates information on transmission power) indicating the PHR calculated by the PHR calculation unit 341 using the PUSCH (or PUCCH). The PUSCH signal is transmitted through the antenna 303. The communication unit 302 is configured by RF and the like. In this way, it is possible for the radio terminal 300 to notify the radio base station 100 of the PHR information calculated by the PHR calculation unit 341.

(1.3) Configuration of AF Relay Node

Figure 3:
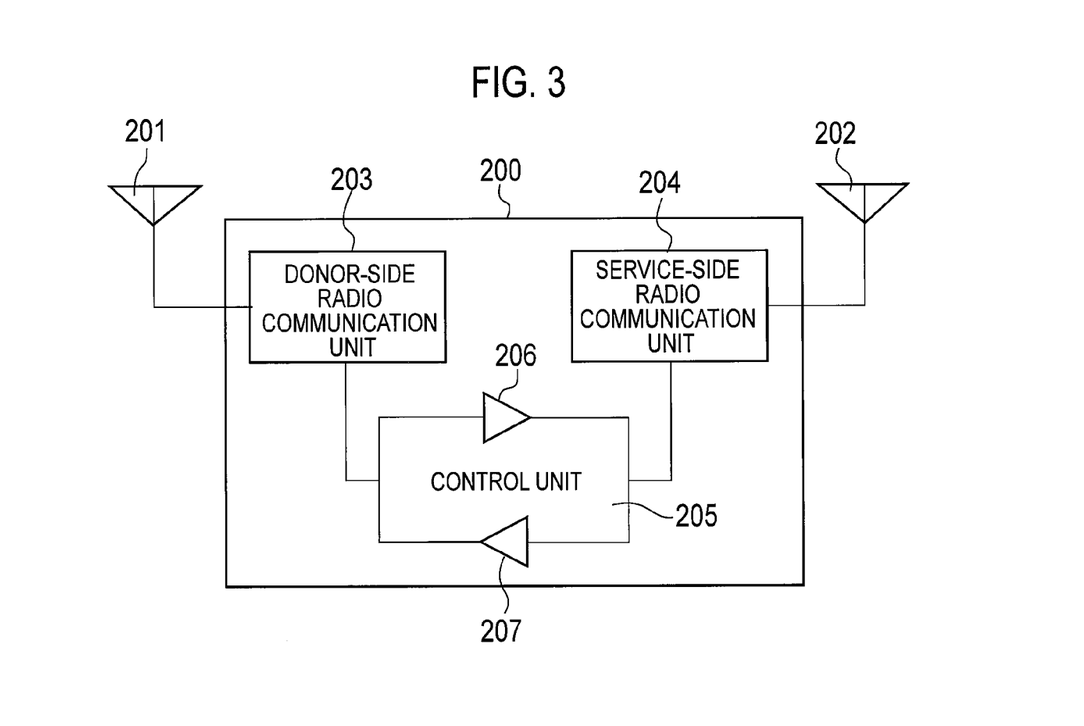
FIG. 3 is a diagram illustrating the configuration of an AF relay node.

FIG. 3 is a diagram illustrating the configuration of the AF relay node 200.

The AF relay node 200, for example, uses an SISO (Single Input Single Output) type of one-input one-output. In addition, the present invention is not limited to the SISO-type AF relay node. For example, an MIMO (Multiple Input Multiple Output) type AF relay node may also be used.

As illustrated in FIG. 3, the AF relay node 200 includes an antenna 201, an antenna 202, a donor-side radio communication unit 203, a service-side radio communication unit 204, and a control unit 205. The control unit 205 includes a DL amplifier 206 and a UL amplifier 207. An amplification rate of the DL amplifier 206 is different from an amplification rate of the UL amplifier 207. In the present embodiment, the amplification rate of the DL amplifier 206 is set to be higher than the amplification rate of the UL amplifier 207.

A communication stream signal (a DL signal) transmitted from the radio base station 100 is received in the antenna 201. The signal received in the antenna 201 is input to the DL amplifier 206 of the control unit 205 through the donor-side radio communication unit 203.

The DL amplifier 206 amplifies the signal input from the donor-side radio communication unit 203 and outputs the amplified signal to the service-side radio communication unit 204. The service-side radio communication unit 204 outputs the signal amplified by the DL amplifier 206 to the antenna 202. The signal amplified by the DL amplifier 206 is retransmitted from the antenna 202 as a DL signal.

A communication stream signal transmitted from the radio terminal 300 is received in the antenna 202. The signal received in the antenna 202 is input to the UL amplifier 207 of the control unit 205 through the service-side radio communication unit 204.

The UL amplifier 207 amplifies the signal input from the service-side radio communication unit 204 and outputs the amplified signal to the donor-side radio communication unit 203. The donor-side radio communication unit 203 outputs the signal amplified by the UL amplifier 207 to the antenna 201. The signal amplified by the UL amplifier 207 is retransmitted from the antenna 201 as a UL signal.

(1.4) Configuration of Radio Base Station

Figure 4:
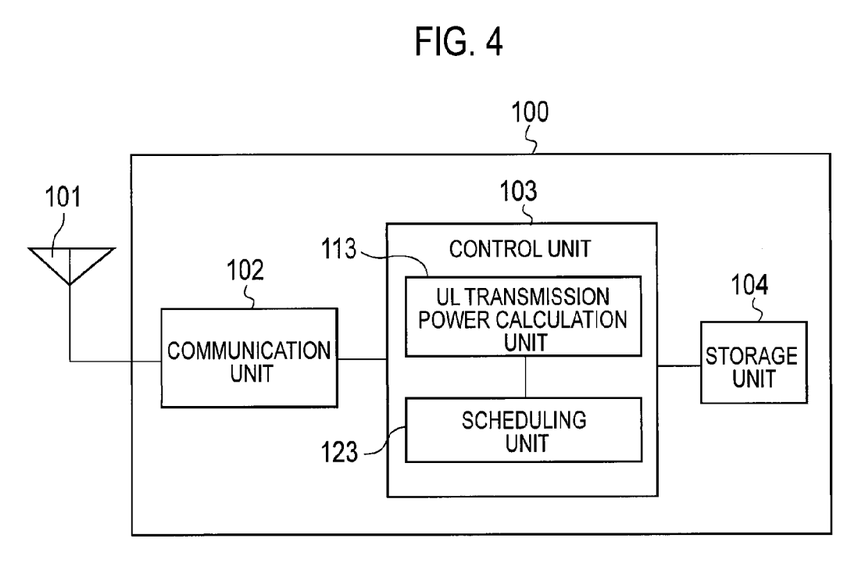
FIG. 4 is a diagram illustrating the configuration of a radio base station of the radio communication system according to the embodiment of the present invention.

FIG. 4 is a diagram illustrating the configuration of the radio base station 100 of the radio communication system according to the embodiment of the present invention.

As illustrated in FIG. 4, the radio base station 100 includes: an antenna 101; a communication unit 102 (a notification unit) configured to transmit (notify) the information element (the $P_{o\_PUSCH}$ and the f(i) of Equation 1, the same shall apply hereinafter) to the radio terminal 300, wherein the information element is used when the radio terminal 300 calculates the transmission power (for example, the transmission power of the PUSCH signal) of the radio terminal 300 by applying the DL propagation loss; a control unit 103 configured to control information element; and a storage unit 104 configured to store various types of information.

The antenna 101 receives a signal (a UL signal) from the radio terminal 300 through the AF relay node 200. The communication unit 102 is configured by RF and the like.

The control unit 103, for example, is configured by a CPU (Central Processing Unit) and the like, and controls various functions of the radio base station 100.

The communication unit 102 receives a signal, which is transmitted from the radio terminal 300 through the AF relay node 200, through the antenna 101. The signal received in the communication unit 102 includes the above-mentioned PHR information from the radio terminal 300. The signal received in the communication unit 102 is output to the control unit 103.

The communication unit 102 transmits information element to the radio terminal 300 using PDCCH (Physical Downlink Control Channel) together with information indicating radio resources (RB and MCS) assigned to the radio terminal 300 by a scheduling unit 123 which will be described later. The information indicating radio resources and the information element are defined as scheduling information. In addition, the information element may be transmitted to the radio terminal 300 through an individual control channel, separately from the information indicating radio resources.

The control unit 103 includes: a UL transmission power calculation unit 113 configured to calculate the UL transmission power of the radio terminal 300; and the scheduling unit 123 configured to assign the radio resources.

The UL transmission power calculation unit 113 estimates the transmission power of the radio terminal 300, which is calculated by the radio terminal 300 using Equation 1 above. Specifically, the UL transmission power calculation unit 113 estimates the transmission power of the PUSCH signal in the radio terminal 300 based on the PHR information from the radio terminal 300 and the information indicating the maximum transmission power of the radio terminal 300, which is stored in the storage unit 104. More specifically, the UL transmission power calculation unit 113 calculates (estimates) the transmission power of the radio terminal 300 using Equation 3 below. The power calculated using Equation 3 will be referred as "first power".

[Equation 3]

$$P_{PUSCH}(i) = P_{CMAX} - PH(i)[\text{dB}] \quad (3)$$

In Equation 3 above, the $P_{PUSCH}(i)$ denotes the transmission power (the first power) of the radio terminal 300. The $P_{CMAX}$ denotes the maximum transmission power of the radio terminal 300, which is stored in the storage unit 104. The PH(i) denotes the PHR of the radio terminal 300 in the sub-frame i. The PHR is based on the PHR information notified from the radio terminal 300 to the radio base station 100.

When calculating the first power, the UL transmission power calculation unit 113 also calculates the power of the UL signal from the radio terminal 300 based on Equation 1 above using the UL propagation loss between the radio base station 100 and the radio terminal 300, and the information element (the information element stored in the storage unit 104) transmitted (notified) by the communication unit 102 to the radio terminal 300. The calculated power will be referred as "second power". Information indicating the second power is sequentially stored in the storage unit 104.

The scheduling unit 123 performs scheduling for next transmission timing in the radio terminal 300 based on the difference between the first power and the second power calculated by the UL transmission power calculation unit 113. In this case, the scheduling unit 123 assigns the radio resources in order to satisfy the amount of information required for communication between the radio base station 100 and the radio terminal 300. Furthermore, the scheduling unit 123 assigns the radio resources in order to guarantee communication quality between the radio base station 100 and the radio terminal 300. The content of the assignment (the scheduling) of the radio resources will be described later. Furthermore, the scheduling unit 123 calculates information element, which is to be notified to the radio terminal 300, based on individual information (information indicating the capacity of a radio terminal, and the like) of the radio terminal 300.

The storage unit 104 stores information indicating the maximum transmission power of the radio terminal 300. Furthermore, the storage unit 104 stores information element to be transmitted to the radio terminal 300 by the communication unit 102. The information element is read from the storage unit 104, and is transmitted to the radio terminal 300 together with the information indicating the radio resources assigned to the radio terminal 300 by the scheduling unit 123.

The storage unit 104 stores the second power calculated based on Equation 1 above. Furthermore, the storage unit 104 stores information (hereinafter, referred to as "power difference information") indicating an absolute value of the difference between the first power and the second power, and outputs the stored power difference information to the scheduling unit 123.

When a value indicated by the power difference information has exceeded a predetermined threshold value (hereinafter, referred to as a "first threshold value"), the storage unit 104 counts a state in which the value has exceeded the first threshold value, and sequentially stores count results (count values X). The storage unit 104 outputs the stored count values X to the scheduling unit 123. In addition, the counting, for example, is performed in each subframe (each 1 ms). However, the counting may also be performed at an arbitrary timing. The storage unit 104 resets the count results in predetermined conditions. The reset conditions will be described later. Instead of the storage unit 104, other devices may perform the counting, and the storage unit 104 may store only count results by the other devices and output the stored count values to the scheduling unit 123.

The scheduling unit 123 determines whether the value indicating the power difference information output from the storage unit 104 has exceeded the first threshold value. The first threshold value is set by the product of UL propagation loss (indicates average UL propagation loss in a past predetermined period), which may be arbitrarily set, and the α (the coefficient for controlling the propagation loss compensation rate) applied to Equation 1 above.

When the value indicating the power difference information has exceeded the first threshold value, the scheduling unit 123 instructs the storage unit 104 to perform the counting. The storage unit 104 starts the counting according to the instruction from the scheduling unit 123. The scheduling unit 123 determines whether the count value notified from the storage unit 104 has exceeded a predetermined threshold value (hereinafter, referred to as a "second threshold value"). The second threshold value is set as an arbitrary value in consideration of a propagation environment between the radio base station 100 and the radio terminal 300, and for example, a value corresponding to a time of several frames is set. When the value indicating the power difference information has exceeded the first threshold value, the second threshold value prevents the scheduling unit 123 from immediately performing second scheduling instead of first scheduling which will be described later. The second threshold value is set, so that it is possible for the scheduling unit 123 to appropriately perform scheduling even when radio quality between the radio base station 100 and the radio terminal 300 is instantaneously changed. In addition, the second threshold value may also be appropriately updated according to the radio quality between the radio base station 100 and the radio terminal 300.

(2) Operation of Radio Communication System

Figure 5:
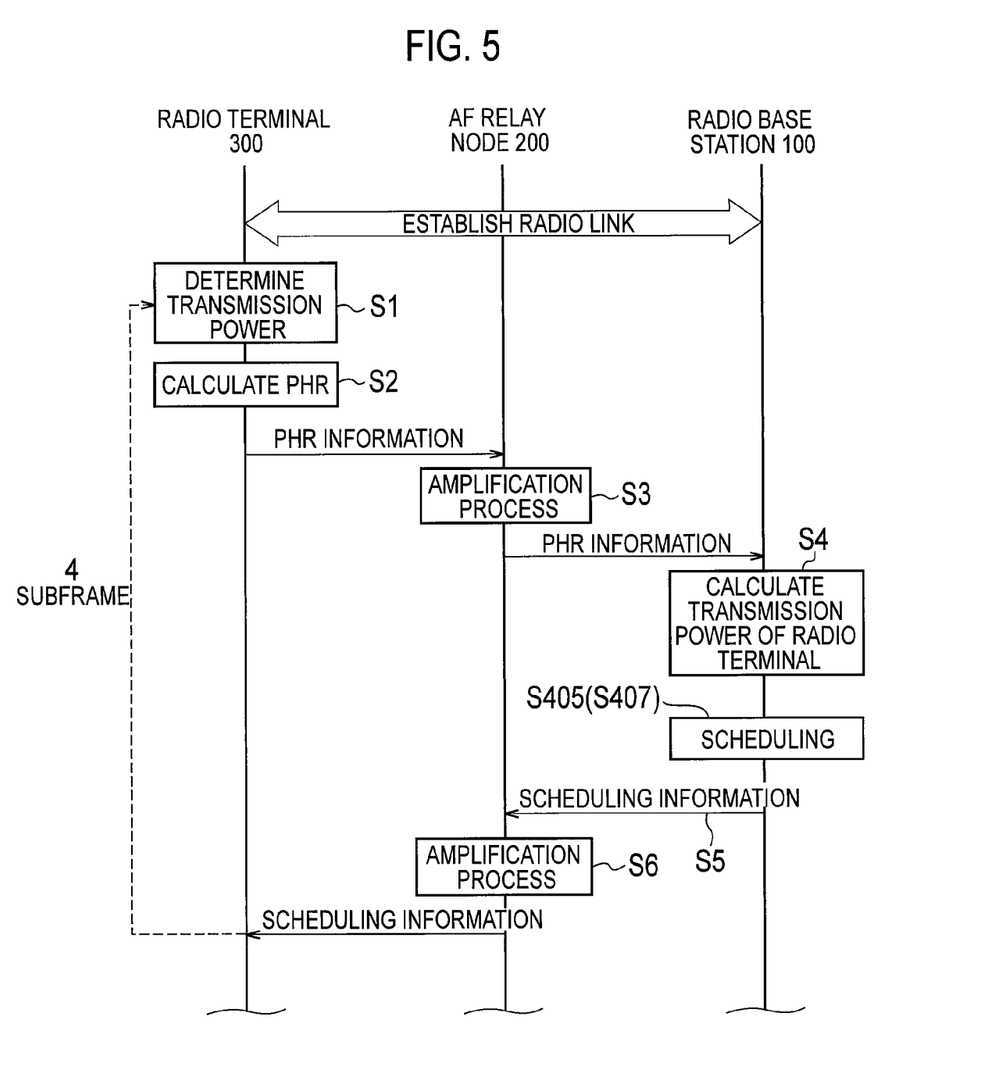
FIG. 5 is a first flowchart illustrating the operation of the radio communication system according to the embodiment of the present invention.

Hereinafter, the operation of the radio communication system will be described. FIG. 5 is a first flowchart illustrating the operation of the radio communication system according to the embodiment of the present invention. Since the first flowchart indicates control performed when a radio link is established between the radio base station 100 and the radio terminal 300 and radio communication starts, the first flowchart will be described based on the assumption that normal scheduling (the first scheduling) is performed regardless of the PL difference between the UL and the DL. The content of the first scheduling will be described later.

The radio base station 100 notifies (transmits) the radio resource and the information element, which are used when the radio terminal 300 performs radio communication with the radio base station 100, as scheduling information. The scheduling information is transmitted from the communication 102 of the radio base station 100. The information element notified from the radio base station 100 to the radio terminal 300 is stored in the storage unit 104. Then, the process proceeds to step S1.

In step S1, the transmission power determination unit 331 of the radio terminal 300 determines transmission power (for example, the transmission power of the PUSCH) for transmitting a data signal based on the scheduling information notified from the radio base station 100 and recognized by the scheduling information recognition unit 321, and the DL propagation loss calculated by the DL propagation loss calculation unit 311.

In step S2, the PHR calculation unit 341 of the radio terminal 300 calculates the PHR of the radio terminal 300 based on the transmission power determined by the transmission power determination unit 331. The communication unit 302 transmits a signal on the PHR information calculated by the PHR calculation unit 341 using a PUCCH (Physical Uplink Control Channel).

Next, the signal (the signal including the PHR information) transmitted from the radio terminal 300 is transmitted to the radio base station 100 through the relay of the AF relay node 200 (step S3). The AF relay node 200 amplifies the signal from the radio terminal 300 and retransmits the amplified signal to the radio base station 100. The radio base station 100 receives the signal from the radio terminal 300, which is transmitted through the AF relay node 200, through the antenna 101. The received signal is output to the communication unit 102, and is output from the communication unit 102 to the control unit 103. The received signal includes the above-mentioned PHR information from the radio terminal 300.

Figure 6:
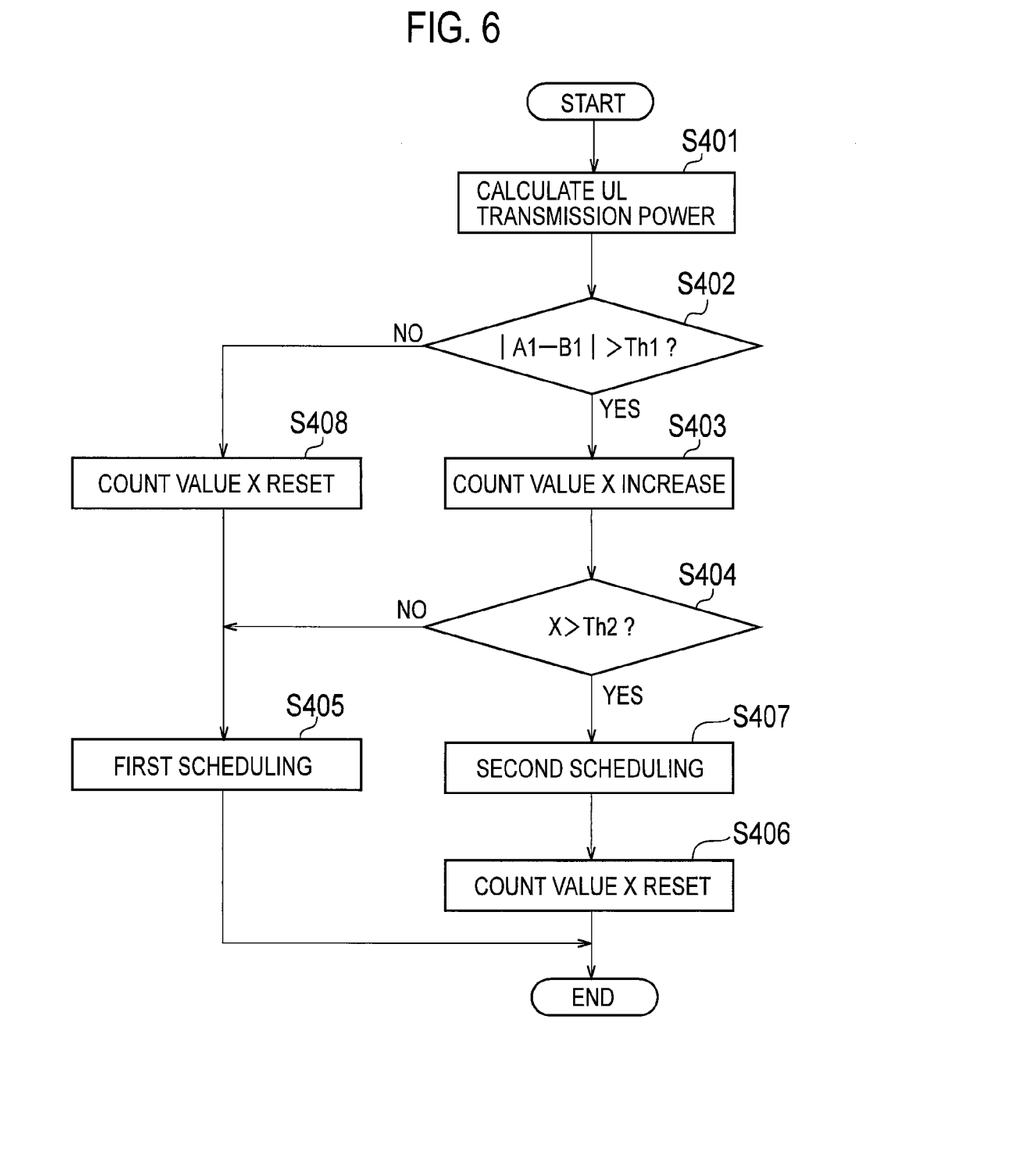
FIG. 6 is a flowchart illustrating first scheduling control of the radio terminal according to the embodiment of the present invention.

In step S4, the control unit 103 of the radio base station 100 controls the UL transmission power in the radio terminal 300. Details of the control are illustrated in FIG. 6. FIG. 6 is a flowchart illustrating first scheduling control of the radio terminal according to the embodiment of the present invention. In step S401, the UL transmission power calculation unit 113 of the control unit 103 calculates (estimates) first power A1 based on the maximum transmission power of the radio terminal 300 stored in the storage unit 104, and the PHR information from the radio terminal 300. Furthermore, when calculating the first power A1, the UL transmission power calculation unit 113 also calculates power (second power B1) of the UL signal from the radio terminal 300 based on Equation 1 using the UL propagation loss between the radio base station 100 and the radio terminal 300, and the information element stored in the storage unit 104.

In step S402, the scheduling unit 123 of the control unit 103 determines whether a value (|A1-B1|: a value indicated by the power difference information) indicating an absolute value of the difference between the first power A1 and the second power B1 has exceeded a first threshold value Th1. When the value indicated by the power difference information has exceeded the first threshold value Th1, the scheduling unit 123 performs the process of step S403. When the value indicated by the power difference information has not exceeded the first threshold value Th1, the scheduling unit 123 performs step S408.

In step S403, the scheduling unit 123 instructs the storage unit 104 to perform counting. The storage unit 104 starts the counting according to the instruction from the scheduling unit 123. The started counting is increased (an increase in the count values X). The storage unit 104 sequentially outputs the count values X to the scheduling unit 123. The scheduling unit 123 determines whether the count value X notified from the storage unit 104 has exceeded a second threshold value Th2 (step S404). That is, the scheduling unit 123 determines whether the period, in which the value indicated by the power difference information has exceeded the first threshold value, has passed a predetermined period. In step S404, when the count value X notified from the storage unit 104 has exceeded the second threshold value, that is, when the period, in which the value indicated by the power difference information has exceeded the first threshold value, has passed the predetermined period, the scheduling unit 123 performs step S407.

When the count value X notified from the storage unit 104 has not exceeded the second threshold value, that is, when the period, in which the value indicated by the power difference information has exceeded the first threshold value, has not continued for the predetermined period, the scheduling unit 123 performs step S405.

In step S405, the scheduling unit 123 performs (continues) the first scheduling. Since the first scheduling is performed based on the 3GPP standard up to now, the first scheduling is performed based on a signal (for example, a Sounding Reference Signal) from the radio terminal 300. If step S405 is completed, the process is ended and proceeds to step S5.

In step S407, the scheduling unit 123 controls many resource blocks to be assigned as compared with resource blocks assigned through the first scheduling performed in step S405. Moreover, the scheduling unit 123 controls a modulation and coding scheme of a lower order to be assigned as compared with a modulation and coding scheme assigned through the first scheduling performed in step S405.

If step S407 is completed, step S406 is performed. In step S406, the scheduling unit 123 resets the count value X in the scheduling unit 123. Furthermore, the scheduling unit 123 instructs the storage unit 104 to stop the counting. The storage unit 104 having received the instruction for stopping the counting from the scheduling unit 123 stops the counting and resets a value counted up to now. Upon completion of step S406, the process proceeds to step S5.

In step S402, when the value indicating the absolute value of the difference between the first power A1 and the second power B1 has not exceeded the first threshold value, the scheduling unit 123 of the control unit 103 performs step S408. Since step S408 is equal to the process of step S406, a description thereof will not be repeated. If step S408 is performed, the process proceeds to step S405 so as to perform the first scheduling.

Processes after step S5 will be described. In step S5, the communication unit 102 of the radio base station 100 transmits information, which indicates the radio resource scheduled by the scheduling unit 123 in step S405 or step S407, toward the radio terminal 300 through a PDCCH (Physical Downlink Control Channel).

The signal (a signal including UL radio resource assignment information and information element) transmitted from the radio base station 100 is transmitted to the radio terminal 300 through the relay of the AF relay node 200 (step S6). The AF relay node 200 amplifies the signal from the radio base station 100 and retransmits the amplified signal to the radio terminal 300.

The radio terminal 300 receives the signal from the radio base station 100, which is retransmitted from the AF relay node 200, and recognizes the UL radio resource assignment information and the information element from the received signal. Then, the radio terminal 300 performs step S1 after four subframes based on the recognized information.

Figure 7:
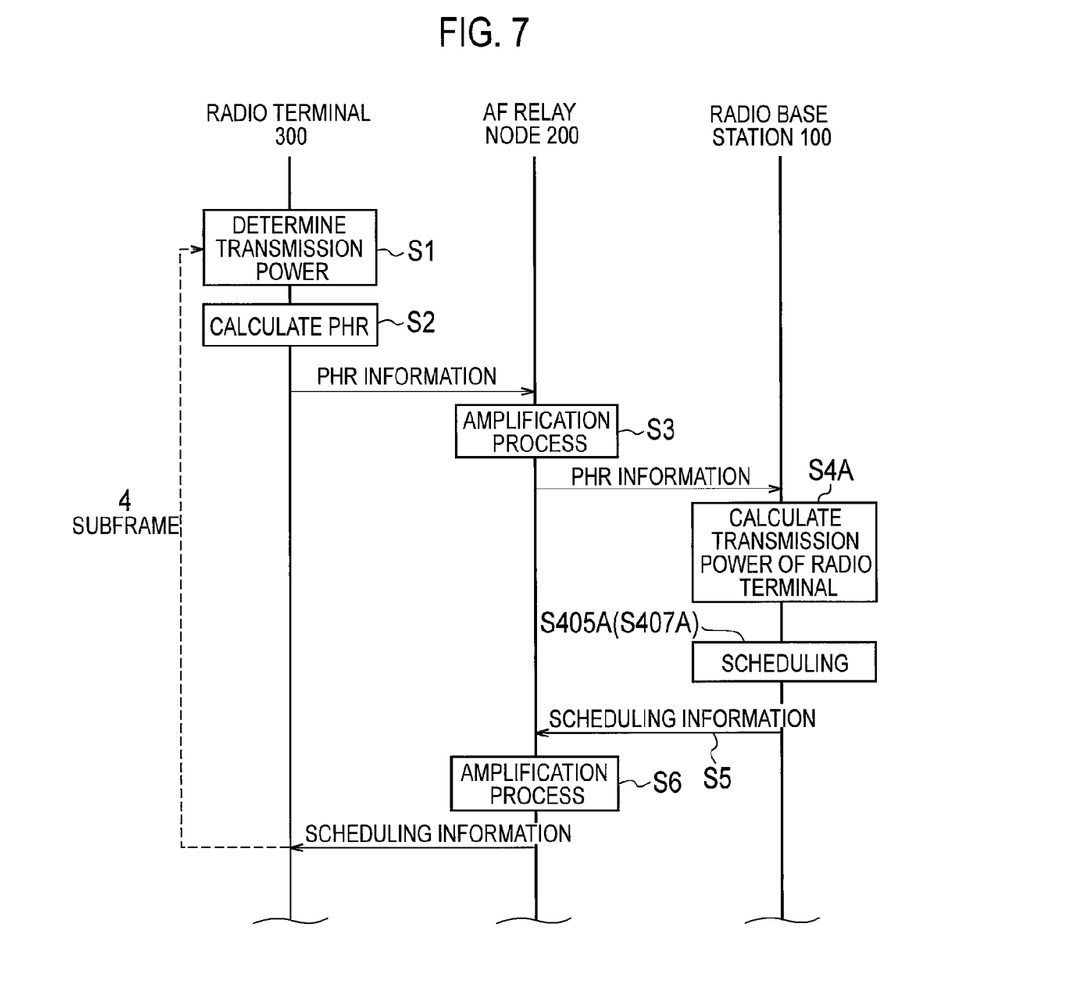
FIG. 7 is a second flowchart illustrating the operation of the radio communication system according to the embodiment of the present invention.
Figure 8:
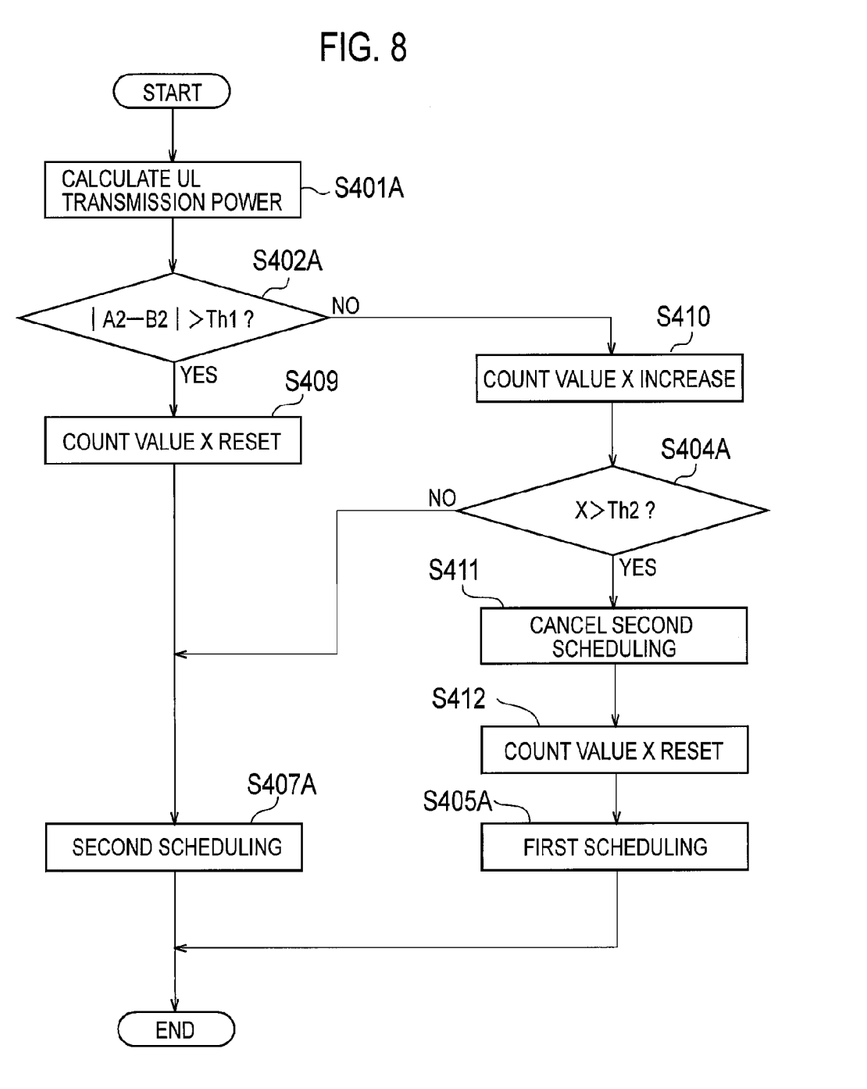
FIG. 8 is a flowchart illustrating second scheduling control of the radio terminal according to the embodiment of the present invention.

Hereinafter, the case in which the radio terminal 300 continuously performs processes from step S1 will be described with reference to FIG. 7 and FIG. 8. In this case, it is assumed that the scheduling unit 123 of the radio base station 100 performs the second scheduling. FIG. 7 is a second flowchart illustrating the operation of the radio communication system according to the embodiment of the present invention. FIG. 8 is a flowchart illustrating second scheduling control of the radio terminal according to the embodiment of the present invention. FIG. 7 illustrates control performed when radio communication between the radio base station 100 and the radio terminal 300 is continued (when radio resource scheduling at the time of radio communication has been performed up to now).

In step S1 of FIG. 7, the transmission power determination unit 331 of the radio terminal 300 determines the transmission power for transmitting the data signal based on the scheduling information notified from the radio base station 100 and recognized by the scheduling information recognition unit 321, and the DL propagation loss calculated by the DL propagation loss calculation unit 311. After step S1, step S2 is performed. Since processes of step S2 and step S3 are equal to those of step S2 and step S3 in FIG. 6, a description thereof will not be repeated. In FIG. 7, after step S3, step S4A is performed.

In step S4A, the control unit 103 of the radio base station 100 calculates the UL transmission power in the radio terminal 300. Details of the control will be described with reference to FIG. 8. In step S401A of FIG. 8, the UL transmission power calculation unit 113 calculates next first power A2 based on the maximum transmission power of the radio terminal 300 stored in the storage unit 104 and the PHR information from the radio terminal 300. Furthermore, when calculating the first power A2, the UL transmission power calculation unit 113 also calculates power (second power B2) of a next UL signal from the radio terminal 300 based on Equation 1 above using the UL propagation loss between the radio base station 100 and the radio terminal 300, and the information element (information element transmitted to the radio terminal 300 at a previous timing) stored in the storage unit 104.

In step S402A, the scheduling unit 123 determines whether a value (|A2-B2|: a value indicated by the power difference information) indicating an absolute value of the difference between the first power A2 and the second power B2 has exceeded the first threshold value Th1. When the value indicated by the power difference information has exceeded the first threshold value Th1, the scheduling unit 123 resets the count value X counted in the storage unit 104 (step S409). If the count value X is reset, step S407A is performed. When the value indicated by the power difference information has not exceeded the first threshold value Th1, the scheduling unit 123 controls the count value X counted in the storage unit 104 to be increased (step S410).

In step S407A, the scheduling unit 123 continuously performs the second scheduling as scheduling for the radio terminal 300. Since the content of the second scheduling in step S407A is equal to that of the second scheduling in step S407, a description thereof will not be repeated.

In step S410, since the storage unit 104 continues the counting, the count value X is increased. The storage unit 104 outputs the count value X to the scheduling unit 123. The scheduling unit 123 determines whether the count value X notified from the storage unit 104 has exceeded the second threshold value Th2 (step S404A). That is, the scheduling unit 123 determines whether the period, in which the value (|A2-B2|) indicated by the power difference information has not exceeded the first threshold value, has passed a predetermined period. In step S404A, when the count value X notified from the storage unit 104 has exceeded the second threshold value, that is, when the period, in which the value indicated by the power difference information has not exceeded the first threshold value, has passed the predetermined period, the scheduling unit 123 stops the second scheduling (step S411). After step S411, step S412 is performed.

In step S412, the scheduling unit 123 resets the count value X in the scheduling unit 123. Furthermore, the scheduling unit 123 instructs the storage unit 104 to stop the counting. The storage unit 104 having received the instruction for stopping the counting from the scheduling unit 123 stops the counting and resets a value counted up to now. After step S412, step S405A is performed.

In step S405A, the scheduling unit 123 performs the first scheduling instead of the second scheduling. Since the content of the first scheduling in the step S405A is equal to that of the first scheduling in the step S405, a description thereof will not be repeated.

In step S404A, when the count value X notified from the storage unit 104 has not exceeded the second threshold value, step S407A is performed. That is, the scheduling unit 123 performs the second scheduling. After step S407A, step S5 is performed.

In step S5, the communication unit 102 of the radio base station 100 transmits information, which indicates the radio resource scheduled by the scheduling unit 123 in step S405A or step S407A, toward the radio terminal 300 through the PDCCH (Physical Downlink Control Channel).

The information element and the power difference information transmitted from the communication unit 102 are stored in the storage unit 104, and are used for next scheduling.

In addition, the scheduling in the embodiment as described above is applied to both the UL and the DL.

(3) Operation and Effect

In the radio communication system in the present embodiment, the radio base station 100 calculates the PUSCH transmission power (the first power) transmitted by the radio terminal 300 based on the maximum transmission power of the radio terminal 300 and the PHR notified from the radio terminal 300, and also calculates the power (the second power) of the PUSCH signal from the radio terminal 300 based on Equation 1 above using the UL propagation loss between the radio base station 100 and the radio terminal 300 and the information element transmitted to the radio terminal 300. Then, when the absolute value of the difference between the first power and the second power has exceeded the first threshold value for a predetermined period, the radio base station 100 controls many resource blocks to be assigned as compared with resource blocks assigned through the scheduling (the first scheduling) performed when the absolute value of the difference has not exceeded the predetermined threshold value, and controls a modulation and coding scheme of a lower order to be assigned as compared with a modulation and coding scheme assigned through the first scheduling. In this way, even in the radio environment in which the UL propagation loss is different from the DL propagation loss, it is possible for the radio base station 100 to perform scheduling capable of avoiding the deterioration of communication quality.

(4) Other Embodiments

As described above, the present invention has been described with the embodiments. However, it should be understood that those descriptions and drawings constituting a part of the present disclosure do not limit the present invention. From this disclosure, a variety of alternate embodiments, examples, and applicable techniques will become apparent to one skilled in the art.

In the above-mentioned embodiment, the AF relay node 200 is provided between the radio base station 100 and the radio terminal 300. However, even in a radio environment in which the AF relay node 200 is not provided between the radio base station 100 and the radio terminal 300, the present invention can be applied in the same manner.

Furthermore, the above-mentioned embodiment is mainly applied to the LTE-Advanced. However, the above-mentioned embodiment can also be applied to other communication standards such as 3GPP-Release9, WiMAX, or next generation PHS.

Thus, it should be understood that the present invention includes various embodiments that are not described herein. Therefore, the present invention is limited only by the specific features of the invention in the scope of the claims reasonably evident from the disclosure above.

What is claimed is:

1. A radio base station communicating with a radio terminal, comprising a control unit configured to perform scheduling of a radio resource with respect to the radio terminal, wherein the control unit estimates transmission power of the radio terminal, which is calculated by the radio terminal, based on information on transmission power notified from the radio terminal, calculates power of an uplink signal from the radio terminal based on uplink propagation loss between the radio base station and the radio terminal, and performs the scheduling based on a difference between a first power obtained by the estimation of the transmission power of the radio terminal and a second power obtained by the calculation of the power of the uplink signal, the radio resource includes a resource block, and the control unit allocates more resource blocks compared with resource blocks assigned through scheduling performed when an absolute value of the difference does not exceed a predetermined threshold value, when the absolute value of the difference between the first power and the second power exceeds the predetermined threshold value.

2. A radio base station communicating with a radio terminal, comprising a control unit configured to perform scheduling of a radio resource with respect to the radio terminal, wherein the control unit estimates transmission power of the radio terminal, which is calculated by the radio terminal, based on information on transmission power notified from the radio terminal, calculates power of an uplink signal from the radio terminal based on uplink propagation loss between the radio base station and the radio terminal, and performs the scheduling based on a difference between a first power obtained by the estimation of the transmission power of the radio terminal and a second power obtained by the calculation of the power of the uplink signal, the radio resource includes a modulation and coding scheme, and the control unit allocates lower order of a modulation and coding scheme compared with a modulation and coding scheme assigned through scheduling performed when an absolute value of the difference does not exceed a predetermined threshold value, when the absolute value of the difference between the first power and the second power exceeds the predetermined threshold value.

3. A radio base station communicating with a radio terminal, comprising a control unit configured to perform scheduling of a radio resource with respect to the radio terminal, wherein the control unit estimates transmission power of the radio terminal, which is calculated by the radio terminal, based on information on transmission power notified from the radio terminal, calculates power of an uplink signal from the radio terminal based on uplink propagation loss between the radio base station and the radio terminal, and performs the scheduling based on a difference between a first power obtained by the estimation of the transmission power of the radio terminal and a second power obtained by the calculation of the power of the uplink signal, and the control unit estimates the transmission power of the radio terminal, which is calculated by the radio terminal, based on information indicating Power Headroom, which is information on transmission power of the radio terminal notified from the radio terminal, and information on maximum transmission power of the radio terminal.

* * * * *